US009619606B2

(12) United States Patent
Summerfelt et al.

(10) Patent No.: US 9,619,606 B2
(45) Date of Patent: Apr. 11, 2017

(54) ADJUSTABLE DUMMY FILL

(71) Applicant: Texas Instruments Incorporated, Dallas, TX (US)

(72) Inventors: Scott R. Summerfelt, Garland, TX (US); Robert G. Fleck, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/230,847

(22) Filed: Mar. 31, 2014

(65) Prior Publication Data

US 2014/0215425 A1    Jul. 31, 2014

Related U.S. Application Data

(62) Division of application No. 12/883,741, filed on Sep. 16, 2010, now Pat. No. 8,883,629, which is a division of application No. 12/460,602, filed on Jul. 21, 2009, now abandoned.

(60) Provisional application No. 61/088,212, filed on Aug. 12, 2008, provisional application No. 61/091,937, filed on Aug. 26, 2008.

(51) Int. Cl.
| | |
|---|---|
| *H01L 21/44* | (2006.01) |
| *G06F 17/50* | (2006.01) |
| *H01L 21/66* | (2006.01) |
| *H01L 27/02* | (2006.01) |
| *H01L 27/11507* | (2017.01) |

(52) U.S. Cl.
CPC ...... *G06F 17/5072* (2013.01); *G06F 17/5068* (2013.01); *H01L 22/26* (2013.01); *G06F 2217/12* (2013.01); *H01L 27/0207* (2013.01); *H01L 27/11507* (2013.01); *Y02P 90/265* (2015.11)

(58) Field of Classification Search
CPC ............ G06F 17/5068; G06F 17/5072; G06F 2217/12; H01L 27/11507; H01L 27/0207
USPC ........ 438/280, 618, 619, 666; 257/773, 776, 257/E21.585, E21.589, E23.151, E25.152
See application file for complete search history.

(56) References Cited

U.S. PATENT DOCUMENTS

| | | | |
|---|---|---|---|
| 6,458,606 B2 * | 10/2002 | Plat et al. | 438/14 |
| 6,768,151 B2 | 7/2004 | Kasai | |
| 7,598,522 B2 | 10/2009 | Yaegashi et al. | |
| 7,667,332 B2 | 2/2010 | Hatano et al. | |
| 2006/0097399 A1 * | 5/2006 | Hatano et al. | 257/773 |
| 2007/0221974 A1 | 9/2007 | Celii et al. | |

* cited by examiner

*Primary Examiner* — Hung Vu
(74) *Attorney, Agent, or Firm* — Rose Alyssa Keagy; Charles A. Brill; Frank D. Cimino

(57) ABSTRACT

A method of placing a dummy fill layer on a substrate is disclosed (FIG. 2). The method includes identifying a sub-region of the substrate (210). A density of a layer in the sub-region is determined (212). A pattern of the dummy fill layer is selected to produce a predetermined density (216). The selected pattern is placed in the sub-region (208).

13 Claims, 8 Drawing Sheets

| | BLOCK % | | | | | | | | | |
|---|---|---|---|---|---|---|---|---|---|---|
| | | 5 | 15 | 25 | 35 | 45 | 55 | 65 | 75 | 85 | 95 |
| LAYER DENSITY % | 0 | 38 | 42 | 48 | 55 | 65 | 80 | - | - | - | - |
| | 5 | 33 | 36 | 41 | 48 | 56 | 69 | 89 | - | - | - |
| | 10 | 27 | 31 | 35 | 40 | 47 | 58 | 74 | - | - | - |
| | 15 | 22 | 25 | 28 | 32 | 38 | 47 | 60 | 84 | - | - |
| | 20 | 17 | 19 | 21 | 25 | 29 | 36 | 46 | 64 | - | - |
| | 25 | 12 | 13 | 15 | 17 | 20 | 24 | 31 | 44 | 73 | - |
| | 30 | 6.3 | 7.1 | 8 | 9.2 | 11 | 13 | 17 | 24 | 40 | - |
| | 35 | 1.1 | 1.2 | 1.3 | 1.5 | 1.8 | 2.2 | 2.9 | 4 | 6.7 | 20 |

DUMMY LAYER PATTERN DENSITY %

*FIG. 5*

| | BLOCK % | | | |
|---|---|---|---|---|
| | | 0-25 | 25-50 | 50-75 | 75-100 |
| LAYER DENSITY % | 0-10 | 40 | 60 | | |
| | 10-20 | 32 | 40 | 56 | |
| | 20-30 | 40 | | | 52 |
| | >30 | 52 | | | - |

DUMMY LAYER PATTERN DENSITY %

*FIG. 6*

ADJUSTABLE DUMMY FILL

CLAIM TO PRIORITY OF NONPROVISIONAL APPLICATION

This application is a divisional of U.S. application Ser. No. 12/883,741 filed Sep. 16, 2010 which is a divisional of U.S. application Ser. No. 12/460,602 filed Jul. 21, 2009, which claims the benefit of under 35 U.S.C. §119(e) of Provisional Application No. 61/088,212, filed Aug. 12, 2008, and to Provisional Application No. 61/091,937, filed Aug. 26, 2008, the contents of all are incorporated herein by reference.

BACKGROUND OF THE INVENTION

Embodiments of the present invention relate to calculation and placement of an adjustable dummy fill layer to improve semiconductor integrated circuit processing.

Shrinking semiconductor integrated circuit feature sizes have placed increasing challenges on semiconductor integrated circuit processing. In particular, a balance between high packing density and yield require a finely tuned manufacturing process. Second order effects that might have been ignored a decade ago are now critical to cost-effective processing as will be explained in detail.

FIG. 1A is a schematic diagram of a 1T-1C ferroelectric random access memory (FeRAM) cell of the prior art. The memory cell includes an access transistor 108 coupled between a bit line 110 and a ferroelectric capacitor 104. The ferroelectric capacitor 104 is coupled between storage node 102 and a plate voltage ($V_P$) terminal 150. FIG. 1B is a cross sectional view of the ferroelectric memory cell of FIG. 1A as disclosed by copending application Ser. No. 11/756,372, filed May 31, 2007, and incorporated by reference herein in its entirety. Common identification numerals are used in multiple figures to indicate the same features. The memory cell includes N-channel access transistor 108 formed on P-substrate 120 having sidewall spacers 126 adjacent the gate region. Source/drain region 110 is connected to a bit line terminal. Source drain region 102 is connected to the storage node. Isolation region 122 separates the memory cell from adjacent memory cells in the memory array. A first dielectric region 130 overlies the access transistor 108. A contact region (CONT) 128 is formed in the dielectric region 130 to electrically connect one plate 140 of ferroelectric capacitor 104 to the storage node 102.

The ferroelectric capacitor 104 is a composite stack formed in layers and etched with a single mask step. The lower plate 140 is preferably formed of titanium aluminum nitride (TiAlN) in conductive contact with iridium layer 142. Likewise, the upper plate 148 is preferably formed of titanium aluminum nitride (TiAlN) in conductive contact with iridium layer 146. The upper and lower plates are separated by ferroelectric layer 144. The ferroelectric layer 144 is preferably formed of lead zirconate titanate (PZT) or strontium bismuth tantalite (SBT). A second dielectric region 160 overlies the ferroelectric capacitor 104. Plate voltage lead (MET1) 150 is formed on this second dielectric region and connected to the top plate 148 of the ferroelectric capacitor 104 by a first via region (VIA0). In areas of the semiconductor memory where there are no memory cells, VIA0 may directly contact CONT to electrically connect MET1 to underlying gate or source/drain regions.

A significant problem disclosed in the prior art involves re-deposition of noble metal components (e.g. Pt, Pd, Ag, Au, Ir) on the sidewalls of the ferroelectric capacitor 104 during plasma etch. Such re-deposition may cause the ferroelectric capacitor to leak or even completely short the upper and lower plates, thereby reducing the overall yield of the semiconductor memory device. The prior art discloses a significant yield improvement is possible by controlling the sidewall slope of the ferroelectric capacitor to a range of 78° to 88° with respect to the surface of dielectric layer 130. This sidewall slope advantageously reduces the re-deposition of noble metal components without a significant reduction of area of the ferroelectric capacitor 104. The present inventors have discovered other factors that influence re-deposition of noble metal components on sidewalls of the ferroelectric capacitor 104 as will be discussed in detail. There is therefore a need to further improve the method of forming ferroelectric capacitors.

BRIEF SUMMARY OF THE INVENTION

In a preferred embodiment of the present invention, a method of placing a dummy fill layer on a substrate is disclosed. The method includes identifying a sub-region of the substrate. A density of a layer in the sub-region is determined. A pattern of a dummy fill layer is selected to produce a predetermined density of the layer in the sub-region. The dummy fill layer pattern is then placed in the sub-region. Local dummy layer fill patterns in a sub-region may be varied based on global density to achieve a repeatable overall density through an iterative procedure. The resulting uniform and repeatable layer density improves local uniformity and device to device repeatability of a density dependent semiconductor process.

BRIEF DESCRIPTION OF THE SEVERAL VIEWS OF THE DRAWING

FIG. 5 is a table showing extracted dummy layer fill pattern density as a function of block layer density and drawn layer density;

FIG. 6 is a table showing a simplified extracted dummy layer fill pattern density as a function of block layer density and drawn layer density;

DETAILED DESCRIPTION OF THE INVENTION

The preferred embodiments of the present invention provide significant advantages in plasma etch stability for a given process over multiple designs as will become evident from the following detailed description.

Figure 1A:
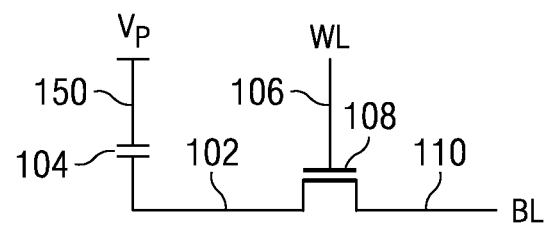
FIG. 1A is a schematic diagram of a 1T-1C ferroelectric random access memory (FeRAM) cell of the prior art.
Figure 1B:
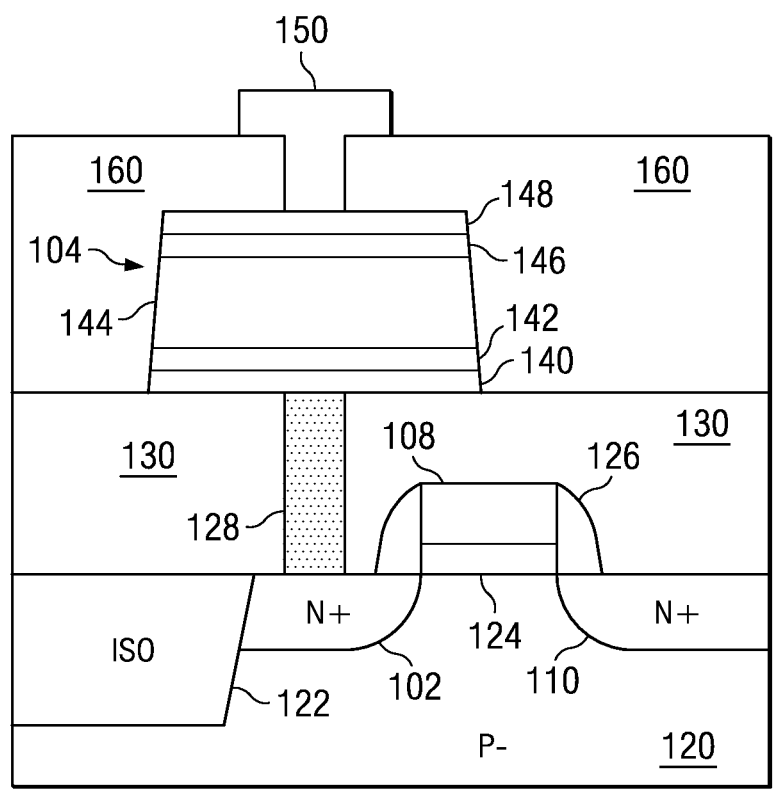
FIG. 1B is a cross sectional view of the FeRAM memory cell of FIG. 1A.

The present inventors have determined that different designs using the same process flow may have significantly different yields. A primary reason for this anomaly is the different layer densities on different designs. In particular, the ferroelectric capacitor 104 of the memory cell (FIG. 1B) will etch at different rates for different memory configurations on different designs. This is because different densities of the etched layer react differently during the plasma etch process. This phenomenon is common to all layers of the semiconductor device including polycrystalline silicon, dielectric layers, and metal interconnect. Sensitivity of the ferroelectric capacitor to etch rate variation, however, is greater than other layers due to re-deposition of noble metal components on the sidewalls as previously discussed. The present inventors have determined that yield may begin to degrade with as little as +/−2% global variation of layer density. Thus, a variation of layer density of less than +/−10% at local areas near critical circuit components in the die as well as over the global wafer area is highly desirable. The present invention is directed to a method of creating an adjustable dummy layer fill pattern during pattern generation (PG) to make the layer density more uniform from a local as well as a global perspective. The extracted dummy layer fill pattern is added to the mask reticle together with the drawn layer pattern and subsequently transferred to the semiconductor device. The density of a sensitive layer such as the ferroelectric capacitor, therefore, will be approximately the same for any design or memory configuration.

In the following discussion it should be understood that formation of the dummy layer fill pattern on a substrate refers to the pattern on the processing reticle as well as to the semiconductor substrate which subsequently receives the pattern. Moreover, it should be understood that a drawn layer is drawn by a circuit designer. Alternatively, an extracted layer is generally formed at PG as a function of the drawn layer and may not be an electrically functional part of the circuit.

Figure 2:
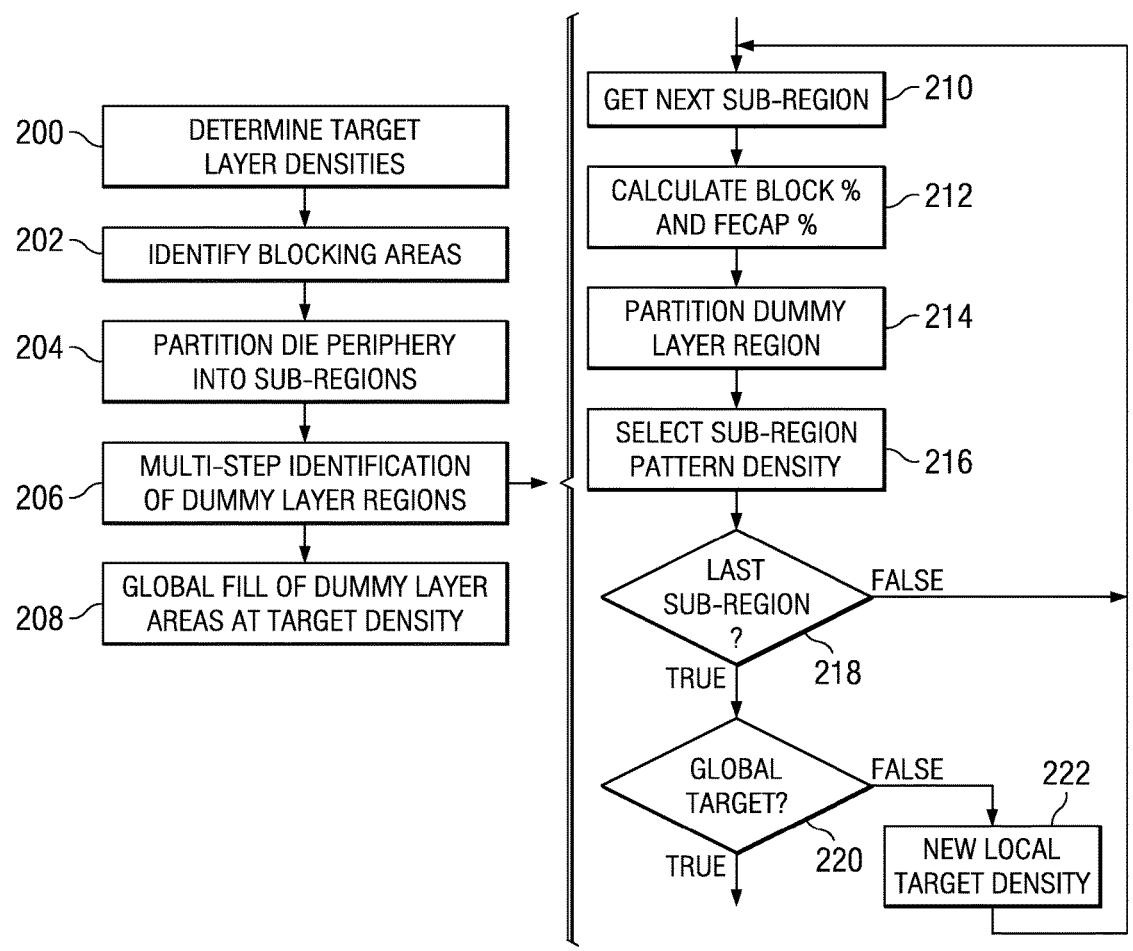
FIG. 2 is a flow chart of a dummy layer fill process of the present invention.

Turning now to FIG. 2, there is a flow chart illustrating the method of creating and placing a dummy layer fill pattern. The method will be explained in detail with reference to FIGS. 3A-3D. Both global and local target layer densities are determined at step 200. The target layer density is a ratio of layer area to total area of a given region. The target layer density is preferably comparable to the density of the layer in the memory array and immediate periphery. The etch process parameters, including gas type, flow rate, source power, bias power, and etch time are preferably optimized for such critical layer geometries in the memory array. For the purpose of the following discussion, it will be assumed that the global and local target layer densities are 36%. Blocking areas of the pattern are identified at step 202. These blocking areas are regions of the where the dummy fill layer is prohibited. Recall from the discussion of FIG. 1B that layer VIA0 is electrically connected to layer CONT in the absence of the ferroelectric capacitor (FeCAP) layer. In this manner, the first metal layer (MET1) is connected to underlying polycrystalline and source/drain regions of the die. Any region of the pattern, therefore, that includes drawn FeCAP, VIA0, or CONT layers or a required spacing from these layers is a blocking area. At step 204, the die pattern is partitioned into sub-regions. The size of these sub-regions is arbitrary and may be, for example, 100 μm by 100 μm. The size should be small enough to maintain uniform local density of the dummy layer and large enough to produce a manageable number of sub-regions. Multi-step identification of dummy layer regions is performed at step 206. Step 206 is expanded in the flow chart on the right of FIG. 2.

Figure 3A:
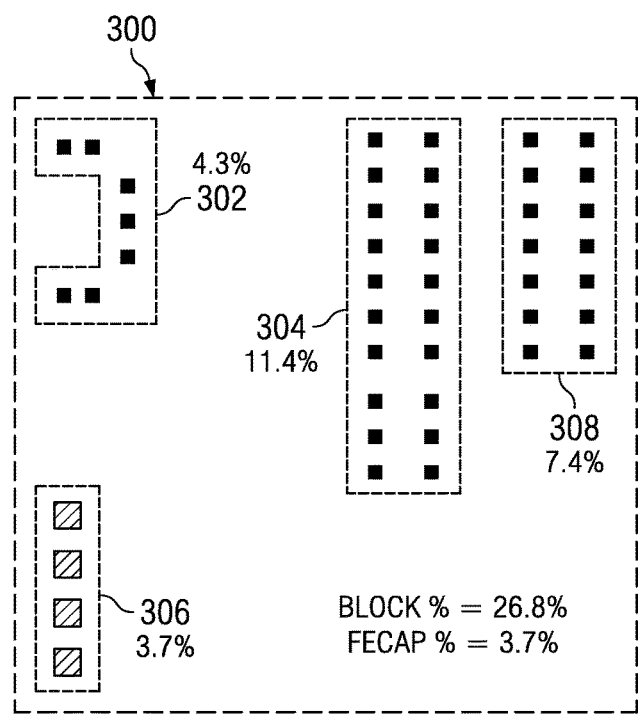
FIGS. 3A-3D are diagrams of a portion of a semiconductor integrated circuit showing the dummy layer fill process according to the flow chart of FIG. 2.
Figure 3B:
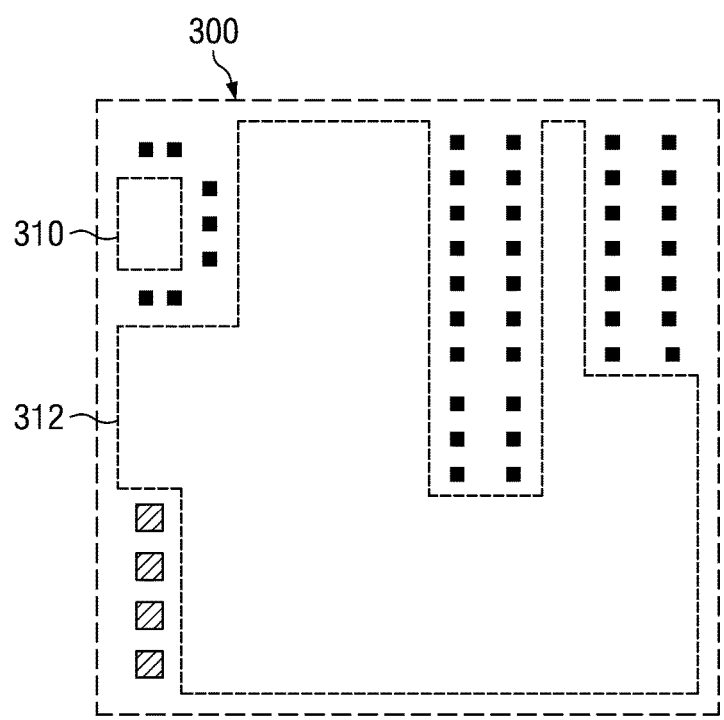
Figure 3C:
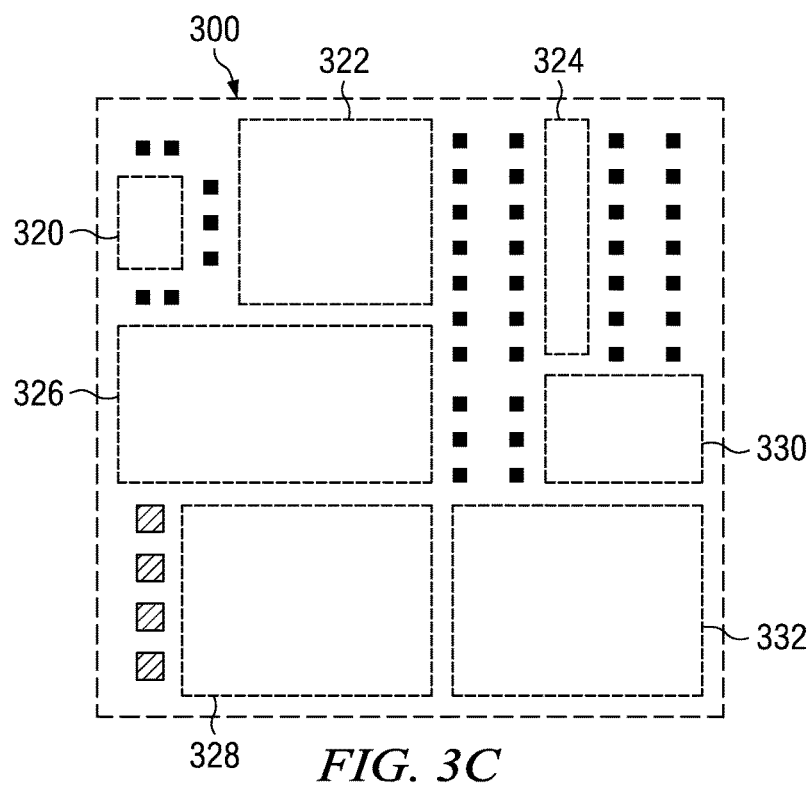

Step 210 of multi-step identification begins with a first sub-region and sequentially steps through all sub-regions. Referring now to FIG. 3A, there is a simplified diagram of a sub-region 300 of the pattern. The sub-region includes blocking areas 302, 304, and 308, having shaded CONT and VIA0 layers as well as a required minimum space from these layers. The density of each blocking area is a ratio of each blocking area to the total area of the sub-region 300 as a percentage. Thus, blocking areas 302, 304, and 308 have densities of 4.3%, 11.4%, and 7.4%, respectively, for a total blocking area density of 26.8%. Additionally, area 306 includes four shaded FeCAP geometries for a layer density of 3.7%. Both the blocking area density (BLOCK %) and the FeCAP layer density (FECAP %) are calculated at step 212. Referring next to FIG. 3B, dummy fill areas 310 and 312 are calculated as an inverse of areas 302 through 308. At step 214 the dummy layer region is partitioned into smaller areas. This produces simplified areas more closely approximating rectangles and eliminates complex areas having internal voids. FIG. 3C illustrates the result of partitioning the dummy layer region at step 214. Area 320 is already sufficiently small so that no further division is necessary. Area 320, therefore, is accepted without further partitioning. Area 312, however, is partitioned into areas 322 through 332.

Figure 4C:
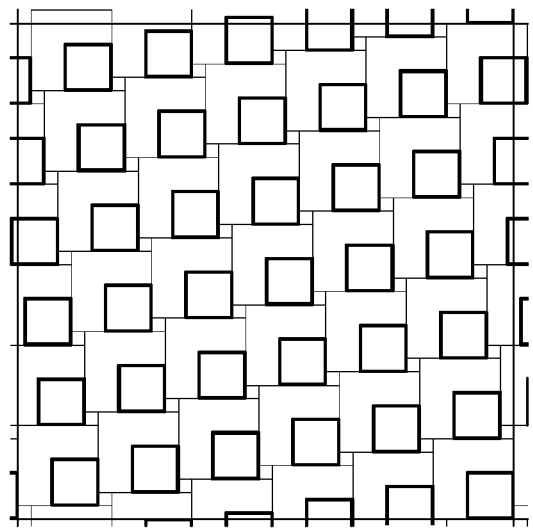
FIGS. 4A-4C are extracted dummy layer fill patterns having different densities.
Figure 4B:
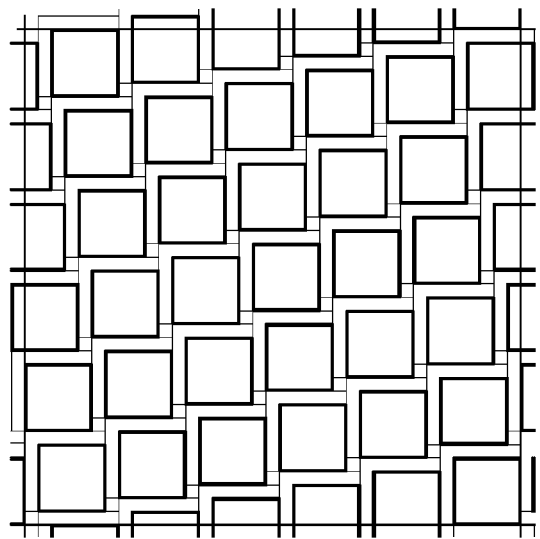
Figure 4A:
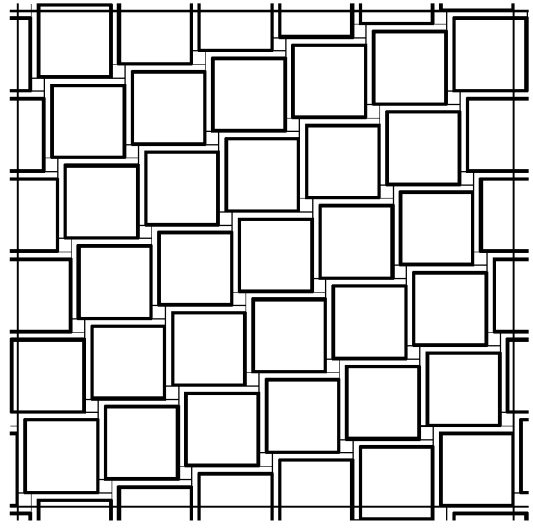

At step 216 a sub-region pattern density is selected. Although the fill pattern is arbitrary, the present inventors have selected square geometries having offset centers as represented at FIGS. 4A through 4C for a preferred embodiment of the present invention. Here, FIG. 4A has the greatest density and FIG. 4C has the least density. The dummy layer fill pattern density is selected from the table at FIG. 5. Table entries of FIG. 5 are desired dummy layer fill pattern densities as a function of BLOCK % and FECAP % densities. The BLOCK % density columns range from 5% to 95%. The FECAP % layer density rows range from 0% to 35%. For example, if a sub-region has no FeCAP layer the dummy layer fill pattern density is taken from the 0% row. If the BLOCK % is 5%, then 95% of the sub-region should receive a dummy layer pattern having a 38% density. This produces a FeCAP layer density in the sub-region of 0.95*38%=36.1%, which is close to the 36% target layer density. Similarly, if the BLOCK % is 35%, then 65% of the sub-region should receive a dummy layer pattern having a 55% density. This produces a FeCAP layer density in the sub-region of 0.65*55%=35.75%, which is also close to the 36% target layer density.

When a sub-region includes a FeCAP drawn layer, it must also be included in the calculation. For example, if the sub-region includes a FeCAP drawn layer having a 20% density, the dummy layer fill pattern density is taken from the 20% row. If the BLOCK % is 15%, then 85% of the sub-region should receive a dummy layer pattern having a 19% density. This produces a FeCAP layer density in the sub-region of 0.85*19%+20% or 36.15%. Similarly, if the BLOCK % is 45%, then 55% of the sub-region should receive a dummy layer pattern having a 29% density. This produces a FeCAP layer density in the sub-region of 0.55*29%+20%=35.95%.

Figure 3D:
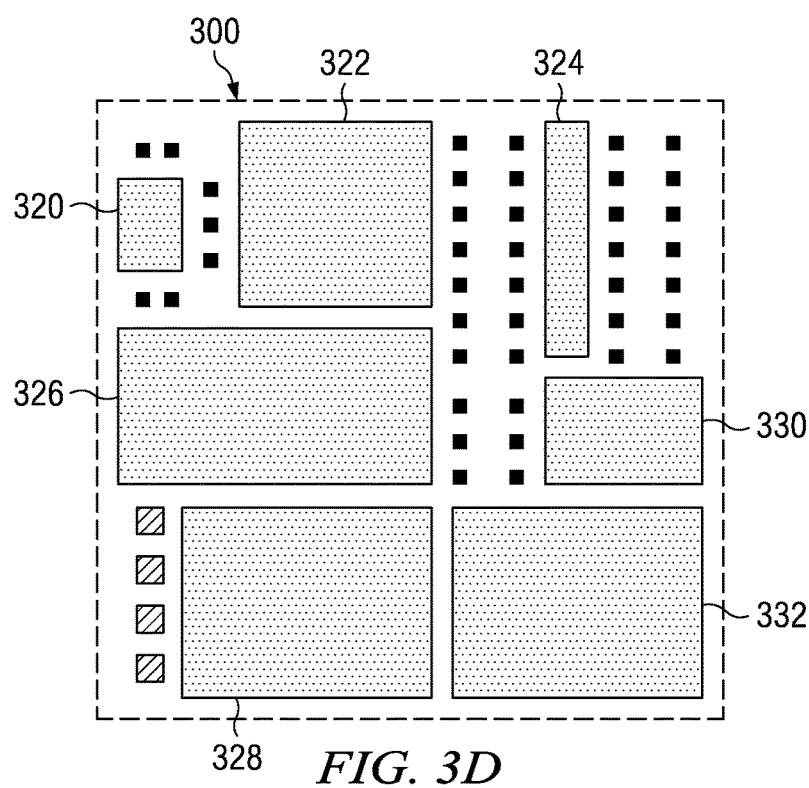

Recall that the BLOCK % and FECAP % densities from FIG. 3A are 26.8% and 3.7%, respectively. The pattern density for FIG. 3A, therefore, is selected from the third column (25%) of BLOCK % and the second row (5%) of layer density. These tabulated values are nearest to the calculated values. Thus, a dummy layer pattern density of 41% is used to fill areas 320 through 332. This will produce a pattern density of approximately 0.732*41%+3.7%=33.7%. This is 2.3% below the selected target layer density of 36%. However, subsequent sub-region density calculations will produce an average dummy layer pattern density that approaches 36%. If there are remaining sub-regions at step 218, control is transferred to step 210, and the multi-step identification is repeated. Alternatively, when all sub-regions are associated with a respective pattern density, control transfers to step 220 to determine if the global target layer density is achieved. If the global density target is not achieved, a new local target layer density is selected at step 222. Then various local fill pattern densities are either increased or decreased to better achieve the target global density. Control is then transferred to block 210 and the process is then repeated until the global layer target is achieved. Once the global target layer density is achieved, control transfers to step 208. At step 208, eligible areas of each sub-region are filled with respective dummy fill patterns as shown at FIG. 3D to produce a local and global target layer density of approximately 36%.

In one embodiment of the present invention, global layer density starts at either a maximum or minimum value and the fill process is repeated with progressively lower or higher local density fill patterns, respectively, until the global density target is achieved.

In another embodiment, global layer density starts at an intermediate value that may be arbitrary or determined by calculation based on blocking area size. Various local fill pattern densities are then progressively either increased or decreased based on the corresponding global layer density variation until the final global layer density target is achieved. The resulting uniform density advantageously produces repeatable etch rates locally and globally for multiple designs and memory configurations. Overall yield is significantly improved.

The table of FIG. 5 produces a near optimal fill density but requires 56 different fill density patterns. Although this is well within the processing capability of the PG program, the number of fill patterns may be reduced by taking advantage of the tendency to produce the target fill density over a large number of sub-regions. Referring now to the table of FIG. 6, the number of fill patterns is reduced from 56 (FIG. 5) to 5. Significant deviation from the target pattern density is noted where the BLOCK % is greater than 75%. This is because there is insufficient unblocked sub-region area to reach the target pattern density for any dummy layer pattern density. Even with such deviation, however, the global pattern density advantageously tends toward the target pattern density with acceptable deviation in the local pattern density. As a result, yield is greatly improved and computational complexity is reduced.

Figure 7:
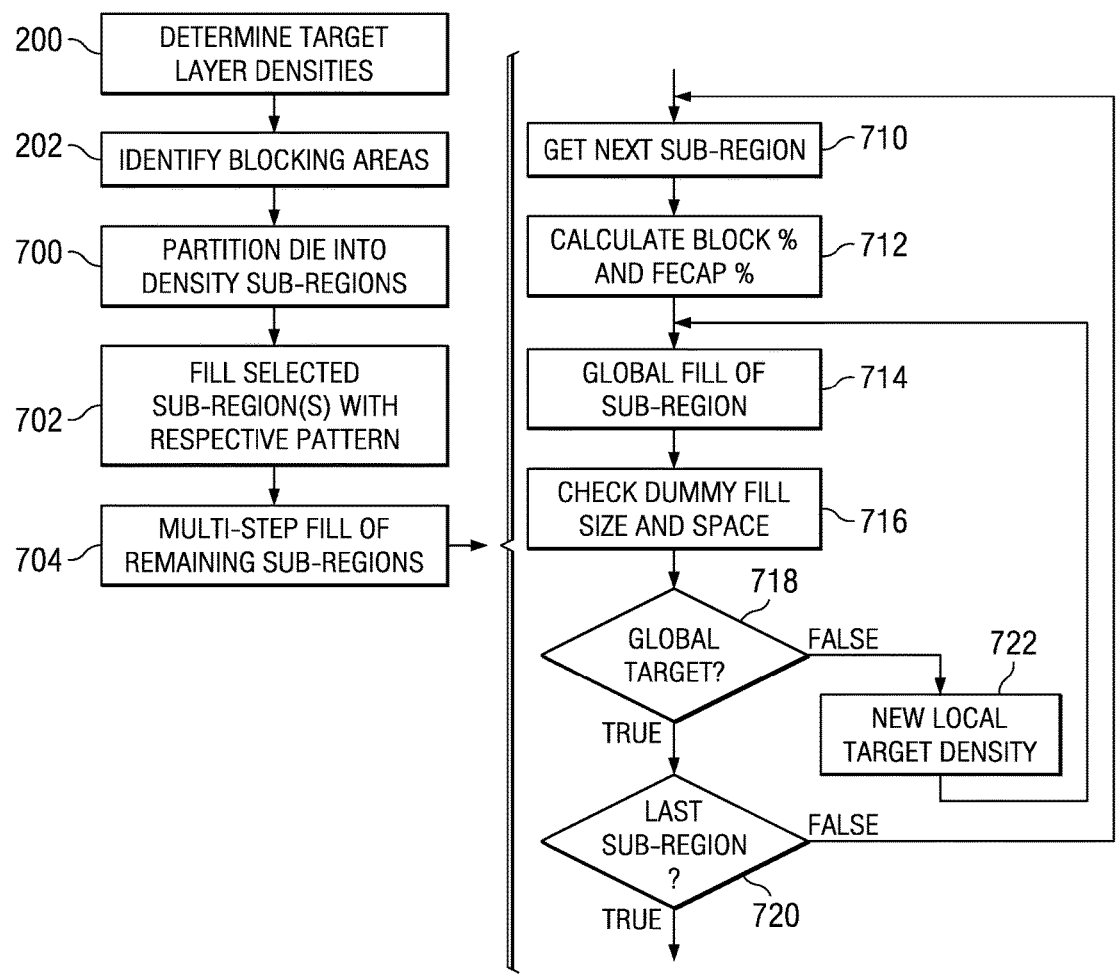
FIG. 7 is a flow chart of another embodiment of a dummy layer fill process of the present invention.

Turning now to FIG. 7, there is a flow chart illustrating another embodiment of the present invention. As previously described with regard to FIG. 2, both global and local target layer densities are determined at step 200, and blocking areas of the pattern are identified at step 202. At step 700 the die is partitioned into sub-regions based on blocking layer density. For example, blocking layer density near the memory array will be near the target density. In this case, only a small area of dummy layer fill will be required. This small area is not computationally difficult and may, therefore, use a single fill pattern. Blocking layer density in peripheral circuit areas, however, may be considerably less than the target density and may require more aggressive dummy fill patterns for each area. This may be accomplished by reducing space between dummy fill geometries to near minimum permitted by design rules. Finally, intermediate blocking area density areas may require iterative dummy fill pattern computation as described with regard to FIG. 2. According to a preferred embodiment of the present invention, therefore, the die is partitioned into near target density blocking regions, low density blocking regions, and at least one intermediate blocking density region. At step 702, each of the near target density blocking regions and low density blocking regions are filled with respective dummy fill patterns in a single step rather than by iterative calculation.

Multi-step fill of remaining intermediate density blocking layer regions proceeds at step 704 as shown in detail at the right. A first sub-region is selected at step 710. As previously described with regard to FIG. 2, the both the blocking area density (BLOCK %) and the FeCAP layer density (FECAP %) are calculated at step 712. The selected sub-region is filled with an initial dummy fill pattern. The dummy layer geometry size and space are checked at step 716. This is similar to a design rule check as is known in the art. At step 718, the sub-region density is compared to the global target density. If it is out of range, a new local target density is selected at step 722 and control returns to step 714. Alternatively, if the sub-region density is within an acceptable range, a next sub-region is selected and control returns to step 710. The multi-step fill operation of step 704 is repeated until all sub-regions are filled. The embodiment of FIG. 7 advantageously reduces computational complexity of the dummy layer fill procedure over FIG. 2 by filling most of the die with fixed dummy fill patterns based on blocking layer density. Iterative dummy fill of remaining sub-regions is limited to 20% to 50% of the die.

Figure 8:
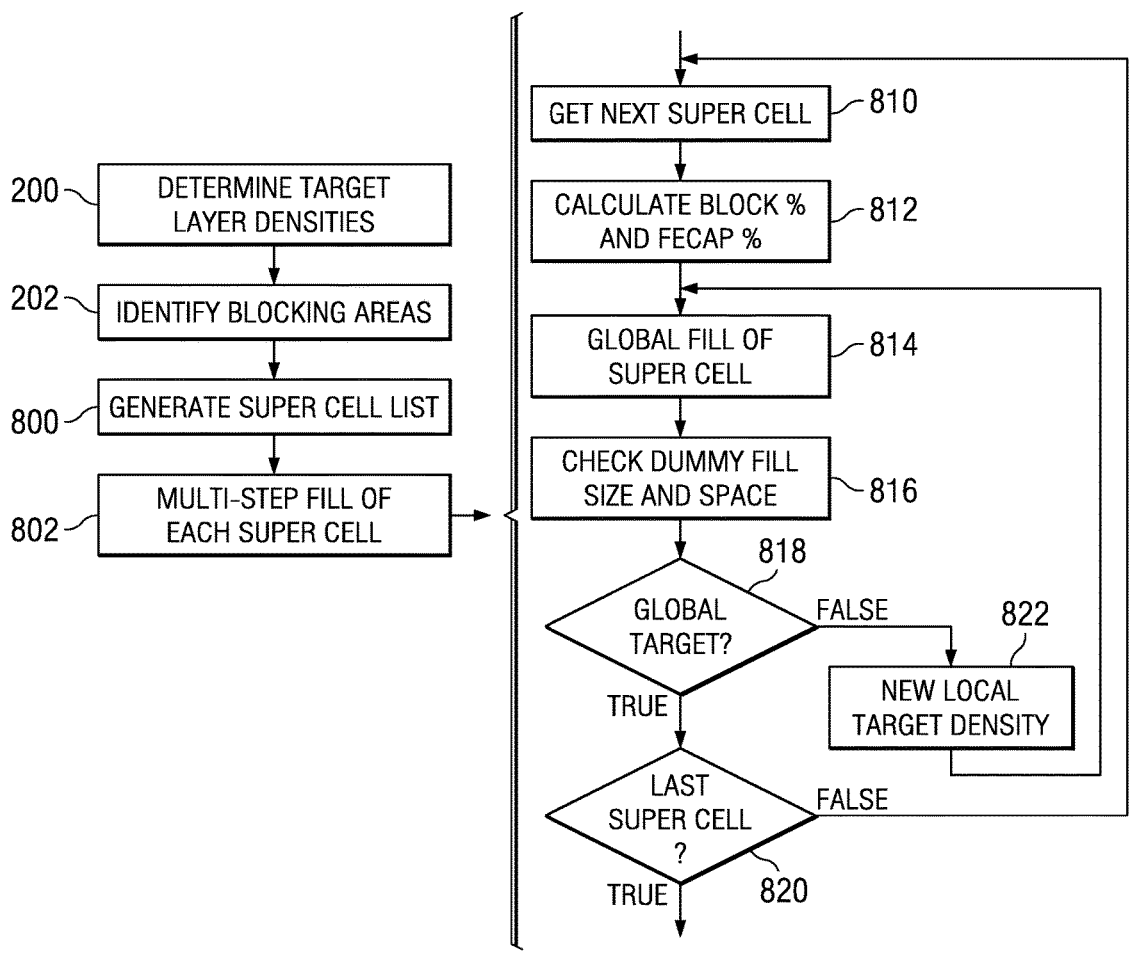
FIG. 8 is a flow chart of yet another embodiment of a dummy layer fill process of the present invention.

Referring now to FIG. 8, there is a flow chart illustrating yet another embodiment of the present invention. As previously described with regard to FIG. 2, both global and local target layer densities are determined at step 200, and blocking areas of the pattern are identified at step 202. At step 800 a super cell list is generated. Each super cell is a cell having other cells placed within it. This list is preferably related to memory array cells, decode and sense amplifier logic, and peripheral logic having high, intermediate, and low blocking layer density. For example, the list may be generated by designers and furnished to process engineers. At step 802, each super cell is subjected to iterative multi-step fill comparable to sub-region fill as previously described with regard to FIG. 7. An important difference is that stepped or repeated cells may only require placement of a dummy layer fill pattern in one cell. This cell together with the calculated dummy layer fill pattern is then repeated as required.

Multi-step fill of the super cells proceeds at step 802 as shown in detail at the right. A first super cell is selected at step 810. As previously described with regard to FIG. 2, the both the blocking area density (BLOCK %) and the FeCAP layer density (FECAP %) are calculated at step 812. The selected super cell is filled with an initial dummy fill pattern. The dummy layer geometry size and space are checked at step 816. This is similar to a design rule check as is known in the art. At step 818, the super cell density is compared to the global target density. If it is out of range, a new local target density is selected at step 822 and control returns to step 814. Alternatively, if the super cell density is within an acceptable range, a next super cell is selected and control returns to step 810. The multi-step fill operation of step 804 is repeated until all super cells are filled. The embodiment of FIG. 8 advantageously reduces computational complexity of the dummy layer fill procedure over FIG. 7 by iteratively filling super cells of the die with dummy fill patterns. The super cells are then repeated as required. The dummy fill layer for each super cell, therefore, is only calculated once.

Still further, while numerous examples have thus been provided, one skilled in the art should recognize that various modifications, substitutions, or alterations may be made to the described embodiments while still falling with the inventive scope as defined by the following claims. Moreover, although a preferred embodiment of the present invention employs the flow chart of FIG. 2 to produce the dummy fill layer, the order of steps is not critical. For example, the order of steps 202 and 204 may be reversed. Step 214 reduces computational complexity but is not strictly necessary. Finally, step 208 may be performed for each sub-region during multi-step identification 206. Other combinations will be readily apparent to one of ordinary skill in the art having access to the instant specification.

What is claimed is:

1. A method of placing a dummy fill layer on a substrate, comprising:
    determining a global target layer density;
    identifying a plurality of sub-regions of the substrate;
    determining a local target density of a layer in each respective sub-region;
    selecting a first pattern of the dummy fill layer to place in a first of the plurality of sub-regions; and
    selecting a second pattern of the dummy fill layer to place in a second of the plurality of sub-regions.

2. A method as in claim 1, comprising:
    identifying a blocking area of the substrate; and
    identifying the plurality of sub-regions of the substrate apart from the blocking area.

3. A method as in claim 1, comprising:
    partitioning the substrate into plural sub-regions including the first and second sub-region; and
    determining a local target density of the layer in each respective sub-region.

4. A method as in claim 1, wherein a final local target layer density of the first sub-region is within 10 percent of a final local target layer density of the second sub-region.

5. A method as in claim 1, wherein the first pattern of the dummy fill layer is placed in the first of the plurality of sub-regions in a single step.

6. A method as in claim 1, wherein the second pattern is iteratively selected to produce a desired final local target layer density of the second sub-region.

7. A method of placing a dummy fill layer on a die, comprising:
    determining a global target layer density;
    identifying a plurality of super cells of the die;
    determining a local target layer density of a layer in each respective super cell;
    selecting a first pattern of the dummy fill layer to place in a first super cell of the plurality of super cells; and
    selecting a second pattern of the dummy fill layer to place in a second of the plurality of super cells.

8. A method as in claim 7, comprising:
    identifying a blocking area of the first super cell and the second super cell; and
    identifying a sub-region of the first super cell apart from the blocking area of the first super cell and identifying a sub-region of the second super cell apart from the blocking area of the second super cell.

9. A method as in claim 7, wherein a final local target layer density of the first super cell is within 10 percent of a final local target layer density of the second the super cell.

10. A method as in claim 7, wherein the second pattern is iteratively selected to produce a desired final local target layer density of the second super cell.

11. A method as in claim 10, wherein the second super cell is placed a plurality of times with the desired final local target layer density.

12. A method as in claim 11, wherein the dummy fill layer pattern is placed in one of the repeated cells and repeated with each subsequent placement of said one of the repeated cells.

13. A method as in claim 7, wherein the at least one of the super cells comprises repeated cells, and wherein the dummy fill layer pattern is placed in each of the repeated cells.

* * * * *